(12) United States Patent
Knapich

(10) Patent No.: US 12,190,189 B2
(45) Date of Patent: Jan. 7, 2025

(54) PASSIVE RADIO TRANSMISSION DEVICE

(71) Applicant: AEG Identifikationssysteme GmbH, Ulm (DE)

(72) Inventor: Norbert Knapich, Rosshaupten (DE)

(73) Assignee: AEG Identifikationssysteme GmbH, Ulm (DE)

( * ) Notice: Subject to any disclaimer, the term of this patent is extended or adjusted under 35 U.S.C. 154(b) by 469 days.

(21) Appl. No.: 17/605,641

(22) PCT Filed: Apr. 17, 2020

(86) PCT No.: PCT/EP2020/060814
§ 371 (c)(1),
(2) Date: Feb. 2, 2022

(87) PCT Pub. No.: WO2020/216683
PCT Pub. Date: Oct. 29, 2020

(65) Prior Publication Data
US 2022/0215219 A1 Jul. 7, 2022

(30) Foreign Application Priority Data
Apr. 23, 2019 (DE) ..................... 10 2019 110 509.9

(51) Int. Cl.
*G06K 19/077* (2006.01)
*E05B 19/00* (2006.01)
(Continued)

(52) U.S. Cl.
CPC ...... *G06K 19/0776* (2013.01); *E05B 19/0052* (2013.01); *G06K 19/048* (2013.01);
(Continued)

(58) Field of Classification Search
USPC ...................................................... 343/700 R
See application file for complete search history.

(56) References Cited

U.S. PATENT DOCUMENTS 6,637,245 B1 10/2003 Bolton
9,380,540 B1 * 6/2016 Hermann ........... G07C 9/00309
(Continued)

FOREIGN PATENT DOCUMENTS

| WO | 2006/031822 A2 | 3/2006 | |
| WO | WO-2006053692 A1 * | 5/2006 | ......... E05B 73/0017 |
| WO | 2018/110512 A1 | 6/2018 | |

OTHER PUBLICATIONS

International Search Report in PCT/EP2020/060814, mailed Aug. 3, 2020.

*Primary Examiner* — Hoang V Nguyen
*Assistant Examiner* — Brandon Sean Woods
(74) *Attorney, Agent, or Firm* — Collard & Roe, P.C.

(57) ABSTRACT

A passive radio transmission device is arranged on a front and a back of an electrically conductive carrier plate, wherein the radio transmission device includes, on the front of the carrier plate, a first film having a first antenna and having a microchip coupled to the first antenna and, on the back, a second film having a second antenna, wherein the first film is coupled to the second film via a flexible web, routed around an end face of the carrier plate, that connects the front to the back, so that the second antenna is connected to the first film via at least one connecting line running along the web in order to transmit information from the microchip using both the first antenna and the second antenna, wherein the first film, the second film and the web are combined as one component.

14 Claims, 4 Drawing Sheets

(51) Int. Cl.
    *G06K 19/04*     (2006.01)
    *G07C 9/00*     (2020.01)
    *H01Q 1/22*     (2006.01)
    *H01Q 7/00*     (2006.01)

(52) U.S. Cl.
    CPC ....... *G07C 9/00944* (2013.01); *H01Q 1/2208* (2013.01); *H01Q 7/00* (2013.01)

(56) References Cited

U.S. PATENT DOCUMENTS

| | | | |
|---|---|---|---|
| 10,467,519 | B2 | 11/2019 | Yamaoka et al. |
| 11,091,011 | B2 * | 8/2021 | Asher .................... B60J 5/0416 |
| 2005/0242959 | A1 | 11/2005 | Watanabe |
| 2006/0027666 | A1 * | 2/2006 | Glaser ................ G08B 13/2417 |
| | | | 235/492 |
| 2007/0080233 | A1 | 4/2007 | Forster et al. |
| 2011/0068178 | A1 * | 3/2011 | Gebhart ................ H01Q 19/10 |
| | | | 235/492 |
| 2013/0063247 | A1 * | 3/2013 | Blatz .................. G07C 9/00309 |
| | | | 340/5.72 |
| 2014/0184462 | A1 | 7/2014 | Yosui |
| 2015/0097040 | A1 * | 4/2015 | Rampetzreiter ............................ G06K 19/07794 |
| | | | 235/492 |
| 2018/0276522 | A1 | 9/2018 | Coronado |

* cited by examiner

PASSIVE RADIO TRANSMISSION DEVICE

CROSS REFERENCE TO RELATED APPLICATIONS

This application is the National Stage of PCT/EP2020/060814 filed on Apr. 17, 2020, which claims priority under 35 U.S.C. § 119 of German Application No. 10 2019 110 509.9 filed on Apr. 23, 2019, the disclosure of which is incorporated by reference. The international application under PCT article 21 (2) was not published in English.

The invention relates to a passive radio transmission device as well as to a method for retrofitting a mechanical key by means of a passive radio transmission device.

Mechanical keys have now become accepted in broad areas of radio-based access control systems, such as RFID (radio-frequency identification) systems, for example. Reasons for this are, among others, that access authorizations can be conveniently granted or revoked with radio transmission devices. Compared with conventional mechanical keys, these therefore do not have to be mechanically remachined. Likewise, keys do not have to be issued or withdrawn for an expansion or reduction of access rights. In certain areas, however, it is necessary that mechanical key systems be operated in parallel with radio-assisted access monitoring systems. For example, mechanical door-locking systems are needed for access to areas that must still be accessible even during a power failure or an outage of the electronic access-control system.

The combination of RFID transmitters with mechanical keys is known from the general prior art.

WO 2006/031822 discloses an RFID chip that may be disposed on one side of a key along its blade or its bow in order to upgrade the key to a radio key.

From U.S. Pat. No. 6,637,245 B1, an RFID transmitter is known that is introduced and fixed in a through bore of a key bow. For upgrading of the mechanical key, it is provided with a through bore, which penetrates its bow and into which the RFID transmitter is molded together with a holder of plastic.

Radio-based access-control systems usually comprise a transmitter and a receiver. In the case of RFID systems, the RFID antennas receive electromagnetic waves of the receiver, which causes an inductive current in their coils, so that a signal of the transmitter, often referred to as a radio label, can be transmitted to the receiver. In order to be able to receive electromagnetic waves of a receiver or to be able to transmit electromagnetic waves to the transmitter, a specific spatial orientation, which permits a direct radio transmission, is therefore necessary between the transmitter and the receiver. Especially when the transmitter is disposed on electrically conductive surfaces, the radio transmission is greatly impaired by eddy currents in these surfaces as well as by reflections and interference.

In larger office and residential buildings, a plurality of keys having different authorizations is often issued. Heretofore, a retrofitting of already existing locking systems with radio transmission devices has not been economically possible. For reasons of copy protection, however, mechanical keys—on the basis of manufacturers' instructions—are not to be subsequently machined, so that a use of the above-mentioned known keys with radio transmission devices is possible only via a new purchase. Especially when the radio transmission device can be activated on both sides, a retrofitting of existing locking systems is not possible.

In general, for the identification of objects on electrically conductive surfaces or in the vicinity of electrically conductive surfaces, the problem exists that these objects or surfaces make difficult or even prevent the reading of the transponder.

US 2007/0080233 A1 discloses an RFID transponder having two or more antenna labels, which are disposed around a communication unit, wherein the antenna labels and the communication unit are provided with a dielectric layer, which reduces the interaction with surrounding objects or with the surface on which the transponder is disposed, so that the transmission power of active and passive transponders is improved.

From the general prior art, it is known how to equip electrically conductive objects that are scheduled to be subjected to an identification with several RFID transponders disposed on differently oriented partial faces.

For active transponders that are equipped with their own energy supply, the orientation relative to the receiver is frequently of secondary importance, because energy sufficient for transmission of information is available and the electromagnetic wave is propagated from the ratio transmission device to the receiver by means of reflection at surrounding surfaces. In contrast, passive radio transmission devices are more susceptible to interference in terms of their orientation in space relative to the receiver, and in case of the arrangement in the radio shadow of electrically conducting objects they frequently do not receive sufficient field energy that they are able to convert to electrical energy for transmission of their information.

The inventor has now set the task of specifying an improved passive radio transmission device for arrangement on electrically conductive carriers.

This task is accomplished by independent claims 1 and 13. Further advantageous configurations of the invention are respectively subject matter of the dependent claims. These may be combined with one another in technologically practical ways. The description, especially in conjunction with the drawing, additionally characterizes and specifies the invention.

According to the invention, a passive radio transmission device is specified that is disposed on a front side and a rear side of an electrically conductive carrier plate, wherein the radio transmission device comprises, on the front side of the carrier plate, a first foil having a first antenna and a microchip coupled with the first antenna and, on the rear side, a second foil having a second antenna, wherein the first foil is connected with the second foil via a flexible web, which is routed around an end face of the carrier plate connecting the front side with the rear side, so that the second antenna is connected with the first foil via at least one connecting line running along the web, in order to transmit information from the microchip both on the basis of the first antenna and of the second antenna, wherein the first foil, the second foil and the web are combined as one component part.

The radio transmission device may be designed in particular as a passive RFID transmitter, wherein such radio transmission devices are frequently referred to as transponders. Accordingly, a radio transmission device is specified that comprises two foils that can be disposed on opposite sides of an electrically conductive plate together with two antennas attached to or introduced into these foils. Due to the arrangement of this radio transmission device on several differently oriented sides of the electrically conductive carrier plate, such as a key fob, a metallic workpiece or a mechanical key, for example, the transmission and the reception of information between the radio transmission device and a receiver is independent of the spatial orientation, so that the radio transmission device is able to perform its function on both sides of the electrically conductive carrier plate.

A passive transponder is an electronic identification medium and does not need any battery. It therefore has an almost unlimited lifetime and may be read through all non electrically conductive materials, regardless of the reading angle, light or other environmental influences. However, metallic surfaces, or, stated more generally, electrically conductive objects, shield the electromagnetic field for readout of the transponder. For readout of the transponder, the reading device builds up an electromagnetic field. Within this field, the transponder is activated and transmits its information back, likewise by means of electromagnetic waves. The information is acquired by the reading device, decoded and presented on a display and/or is supplied to an interface for further data processing. The system consists in principle of two components, the mobile or stationary reading unit and the radio transmission device, which is referred to as the transponder. The information is read out by means of radio waves.

The passive properties of the radio transmission device are based on the fact that it is able to transmit only when at least one of the two antennas is disposed in the electromagnetic field of a receiver or is oriented toward this, since otherwise an induction current that permits the transmission operation is lacking.

The advantage of the passive radio transmission device according to the invention lies in that the carrier plate does not have to be mechanically remachined in order to permit a radio transmission on both sides of the key. In particular, it is not necessary to form a recess in the carrier plate in order to permit the transmission and the reception on both sides of the carrier plate, or to dispose several mutually independent transponders on the surface. Moreover, electromagnetic waves of the receiver, by which an induction current is generated in the radio transmission device, can be received from several directions, so that a more reliable communication between the radio transmission device and a receiver is made possible that is almost independent of the orientation of the carrier plate in space.

For example, in the identification of parts by means of RFID transponders, problems are frequently encountered during the identification, since the receiver, due to the electrical conductivity of the component part, in other words the carrier plate, cannot recognize the signal of the transponder. This is the case in particular when the receiver is disposed in the radio shadow of the transponder. The radio transmission device according to the invention now solves this problem in that it is disposed as a continuous component part on two sides of the carrier plate.

The microchip can be programmed one time or several times with information about access authorizations or parts features.

Compared with the case in which the carrier plate is the key bow of a key or is a key fob, the receiver of the radio transmission device is frequently situated in the vicinity of a door lock and is activated when the radio transmission device has been provided with corresponding rights to an electric motor, which opens a lock, so that a door can be opened. The corresponding access information can be stored on the microchip. In this way, it is possible to design the microchip such that is can be provided either one single time or several times with access information.

The first antenna and the second antenna are ideally arranged in the form of spirals, so that an induction current can be generated particularly advantageously. Beyond this, the first antenna and the second antenna are either imprinted on the first foil and the second foil or are embedded in them. Ideally, the microchip is seated at the center of the first antenna, so that the spiral of the first antenna extends outward, starting from the center of the first foil. After a certain number of turns on the first foil, the line of the first antenna is routed via the line connection in the web to the second antenna. The connecting line starting from the first antenna and running via the web leads to the region of the center of the second antenna, so that this is also formed from inside to outside. At the end of the spiral of the second antenna, this leads, again via a connecting line, back via the web to the microchip. Thus the current circuit of the two antennas is closed. Alternatively, it would be possible to construct the second antenna as a spiral not from inside to outside but instead from outside to inside.

The two antennas may be connected in series or disposed relative to one another in a parallel circuit. In a parallel circuit, lines starting from the microchip may lead respectively to the first antenna and to the second antenna.

The return line from the end of the second antenna coil to the microchip is designed to be insulated from the first antenna and from the second antenna.

The web is designed to be flexible, so that, via the web, the first foil can be angled relative to the second foil. Thus the radio transmission device may be disposed as a one-piece construction on two sides of a carrier plate. In order to protect the connecting line running via the web from damage, it is advantageous to dispose the line connection in the fiber of the web that is neutral relative to the vertical axis of the web.

In an alternative embodiment, it is possible to dispose, on the second foil, a further microchip, which may act autonomously just as the first microchip disposed on the first foil already does, or else may correspond with the first microchip on the first foil. Thus the fail safety of the radio transmission device may be increased if both microchips have access to the same information stored on them. In the event of failure of one antenna, for example due to break of the web, the two foils are able to transmit autonomously with their antennas.

Alternatively, however, the information on the two microchips may also be different and in particular may comprise different access authorizations.

According to one embodiment of the invention, the passive radio transmission device on the first foil or on the second foil comprises an energy reservoir, which feeds the microchip with electrical energy.

As an example, such an energy reservoir may be a capacitor. Due to a capacitor, the energy flow generated by the induction current is stored temporarily for the time being, so that the radio transmission device is able, with this energy, to transmit its information from the microchip to a receiver. Due to the arrangement of the capacitor on the second foil, space is saved on the first foil, on which the microchip is already disposed. It is advantageous when the capacitor is disposed at the center of the spiral-shaped second antenna on the second foil. The capacitor may be disposed either in the series circuit of the first antenna and of the second antenna or else may be connected to the microchip via separate incoming and outgoing lines, wherein an incoming line may lead from the coil of the capacitor via a diode, for example. In order to increase the redundancy of the two foils with their antennas and possibly two autonomous microchips, or in order to increase the total capacitance, capacitors may be disposed on both foils.

This energy source is designed such that it is charged by induction currents in the first antenna or the second antenna during reception of electromagnetic waves and is able to supply this energy to the microchip for transmission of access information. Since the capacitor is used in a passive transponder arrangement, it delivers its energy spontaneously to the microchip for transmission of the information. Thus a switch for control of the energy flow out of the energy source is not provided.

In the case that energy sources are disposed on both foils, these may either be connected to the microchip with separate incoming and outgoing lines or else may be disposed as a parallel arrangement in the series circuit of the two antennas. The advantage of a parallel arrangement of energy reservoirs lies in the greater fail safety of the radio transmission device.

According to a further embodiment of the invention, the passive radio transmission device on the first foil or on the second foil comprises a data memory, the data of which can be read out by the microchip.

On a data memory, it is possible either to store additional identification features or else to export the identification features, which would otherwise be saved on the microchip. The microchip is designed to read out the information of the data memory and transmit it to the receiver. Depending on the space on the first foil or the second foil, the data memory and also the capacitor may be disposed on the first foil or on the second foil.

It is also conceivable for the data memory to be enabled by an actuating device, such as a pushbutton, for example, so that an operator of the key is able if necessary to transmit not only the information stored on the microchip but also further information and identification features, provided the radio transmission device generates an adequate induction current when it is situated in the electromagnetic field of a receiver. In this case the actuating device regulates only the additional data memory, so that the functioning of the transponder continues to be passive.

According to a further embodiment of the invention, the passive radio transmission device is provided on the side turned toward the carrier plate with a layer for conduction of the magnetic flux, which layer is formed in particular as a ferrite foil, which is disposed underneath the first foil or the second foil.

The first foil, the second foil and also the web are usually made from a polymer foil. The antennas, the microchip and the further provided component parts are disposed on the polymer foil or in the polymer foil. The layer for conduction of the magnetic flux is disposed in such a way between the carrier plate and the radio transmission device that it separates the electrically conductive carrier plate from the antenna. By virtue of a ferrite foil, the magnetic flux of the antennas during transmission and reception is conducted away from the carrier plate, so that zero or only small eddy currents that would interfere with the transmission power of the antenna due to feedback effects are induced in the carrier plate. In particular, interference effects that occur during the transmission are almost completely suppressed by a ferrite foil.

Alternatively or in addition to the arrangement of the ferrite foil, the two antennas may be wound in different directions relative to the carrier plate, or in other words may be mirrored over the key, so that the eddy current induced in the carrier plate during transmission is at least partly canceled out and negative interference effects and feedback effects are prevented.

According to a further embodiment of the invention, the passive radio transmission device is fastened on the carrier plate by means of an adhesive layer, which is designed in particular as an adhesive foil.

It is advantageous to hollow out the ferrite foil and the adhesive foil in the region of the web, so that this can be routed more closely around the end face of the carrier plate. In particular, the location of the lines running through the web may be adapted to the presence of an adhesive foil or ferrite foil, so that the line connection of the antennas lies as closely as possible in the region of the neutral fiber of the web. However, the radio transmission device or the layer for conduction of the magnetic flux may also be bonded on the carrier plate with an adhesive.

According to a further embodiment of the invention, the passive radio transmission device is provided with a cap disposed around the carrier plate, wherein the cap holds the passive radio transmission device on the carrier plate.

The material of this cap is selected such that it restricts the radio transmission not at all or only slightly. Since the cap surrounds the radio transmission device and thus holds it on the key bow, the adhesive layer could be omitted. The cap protects the radio transmission device from damage. During the retrofitting of a mechanical key or of a key fob, caps are attached in conventional manner to the key bow or to the key fob, in order to protect or to fix the radio transmission device. The cap is advantageously made of soft elastic material or a hard plastic.

A soft elastic cap may be pulled over the carrier plate by temporarily stretching. A cap of a hard plastic could be formed from two shells, which surround the key bow or the key fob. The two shells may either be adhesively bonded or joined to one another via a latching mechanism.

According to a further embodiment of the invention, the first antenna and the second antenna of the passive radio transmission device are connected in series, or the first antenna and the second antenna of the radio transmission device are respectively connected to the microchip, or the first antenna and the second antenna of the passive radio transmission device are connected in parallel.

The arrangement in which the first antenna and the second antenna are respectively connected with separate connecting lines to the microchip may also be referred to as a parallel circuit of the two antennas. The choice of the electrical circuit depends among other factors on the desired fail safety of the radio transmission device and on the desired electronic characteristic of the radio transmission device. Thus a parallel circuit offers the greater fail safety, because, in the event of failure of one antenna or of break of the connection line of the two antennas, the other antenna is still able to transmit. With a series circuit, a greater inductance is achieved in return.

According to a further embodiment of the invention, the flexible web is selected with a width that is made slightly greater than the conductor track width of the connecting line.

Thus the connecting line is protected on all sides from mechanical damage by the web.

According to further embodiments of the invention, the carrier plate is a key bow of a key or a key fob.

By virtue of the arrangement of a passive radio transmission device on both sides of a key bow or of a key fob, mechanical keys or already existing key fobs adapted to a locking system can be retrofitted to transponders without having to remachine them mechanically. Nevertheless, the radio transmission device according to the invention permits the key or key fob to be oriented toward the receiver with an arbitrary side. During the use of the retrofitted key, an operator no longer has to be concerned about the side of the electrically conductive key bow on which the transponder is disposed, so that the use of the key is made more convenient.

According to a further embodiment of the invention, the first foil and the second foil are chosen in such a way with respect to their dimensions that a ring hole remains accessible in the key bow of the key or in the key fob.

Thus the key or the key fob may continue to be used as a mechanical key without having to be mechanically machined. In an alternative configuration of the first and second foils, they may have recesses for ring holes.

According to a further embodiment of the invention, the carrier plate is part of a workpiece to be identified.

Accordingly, the radio transmission device may be disposed on a metallic workpiece, wherein the radio transmission device will be disposed on two faces of the workpiece having respectively one foil. If the workpiece now travels within a production line through a receiver for parts recognition, the location of the workpiece has no significance for the reliable workpiece identification, because the radio transmission device is able to transmit almost into the entire space from two sides. Likewise, the radio transmission device may be disposed on a metallically conductive tool, in order to be able to recognize its use, removal or return reliably by a receiver.

By virtue of the arrangement of a passive radio transmission device on two faces adjoining one another but oriented differently, the reliability of the parts identification is increased, because usually at least one of the two carrier plates of the workpiece is oriented toward the receiver and the foil disposed on this carrier plate therefore does not lie in the radio shadow of the receiver.

The flexible web then permits the arrangement on the adjacent faces, because the radio transmission device may be bent over them.

The flexible web is frequently exposed to mechanical efforts, so that no sensitive component parts such as the microchip or the energy source will be disposed on it. These component parts would adversely influence the flexibility of the web and thus the usability of the passive radio transmission device.

A method for retrofitting a mechanical key is also specified, comprising the steps:
  Provision of a mechanical key, which with respect to its function is adapted to a locking system,
  Provision of a radio transmission device, which comprises a first foil having a first antenna and a microchip coupled with the first antenna, and a second foil having a second antenna, wherein the first foil is connected to the second foil via a flexible web,
  Disposing the first foil of the radio transmission device on a front side of a key bow of the mechanical key,
  Disposing the second foil of the radio transmission device on the rear side of the key bow of the mechanical key, wherein the first foil is connected with the second foil via a flexible web, which is routed around an end face of the key connecting the front side with the rear side, so that the second antenna is connected with the first foil via at least one connecting line running along the web, in order to transmit information from the microchip both on the basis of the first antenna and of the second antenna, and
  Programming the microchip of the radio transmission device with an access authorization.

Ideally, a retrofit set is provided for a mechanical key, in order to upgrade it to a transponder. Such a retrofit set may consist, for example, of several differently shaped ferrite foils, caps and radio transmission devices, which in the provided condition have not yet been programmed with identification features. Thus a fitter who disposes the radio transmission devices on a key may select suitable radio transmission devices corresponding to the key shape. In particular, holes for key rings will be cut out, so that these continue to be usable.

The radio transmission device may be adhesively bonded onto the key bow or onto a layer disposed beforehand onto the key bow for conduction of the magnetic flux, or may be disposed with an adhesive foil.

According to a further method step, the radio transmission device is provided with a cap.

Accordingly, depending on the arrangement of the radio transmission device, a cap may be attached to the key bow of the key or to the key fob. During the use of a cap that protects the radio transmission device, it could be possible to dispense with the adhesive bonding of the radio transmission device, because the cap holds the radio transmission device on the key bow or on the key fob.

According to a further method step, the key bit of the key is removed, so that the key bow forms a key fob.

Should the mechanical part of the key therefore no longer be desired, the key on the key bow of which a radio transmission device is disposed may be simply converted to a key fob.

The invention will be explained in more detail in the following with reference to the drawing, wherein.

Figure 3:
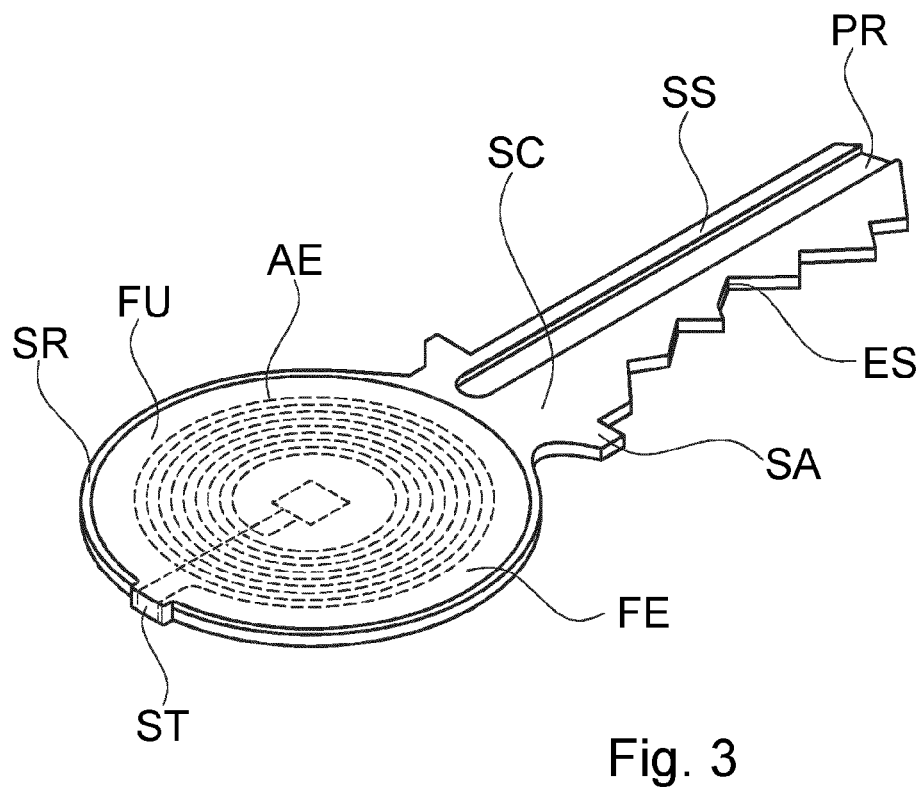
Figure 4:
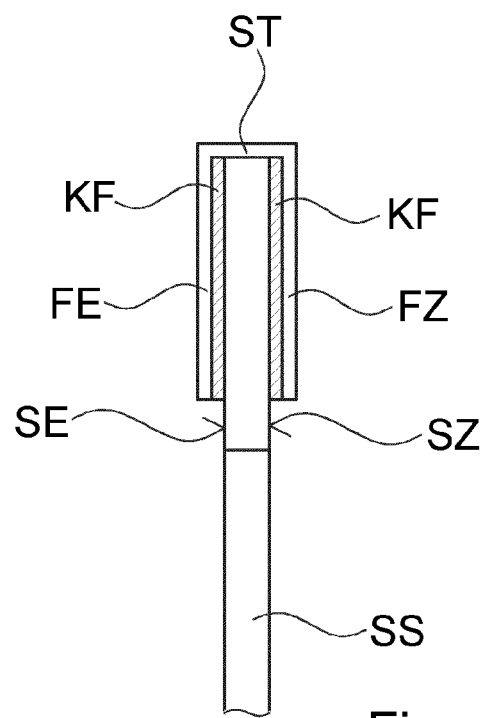
Figure 5:
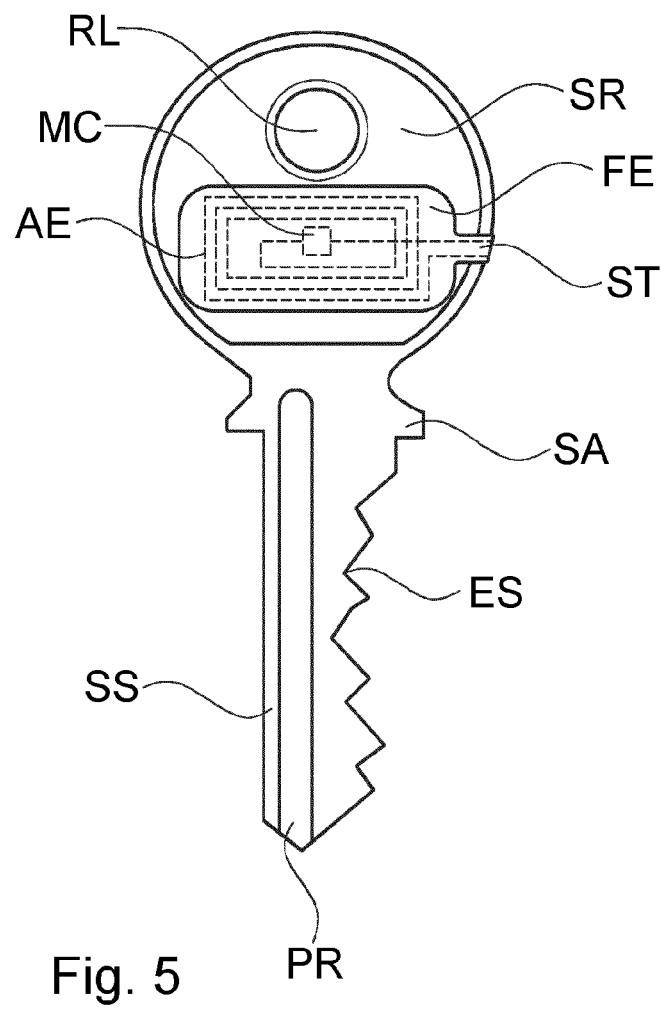
Figure 6:
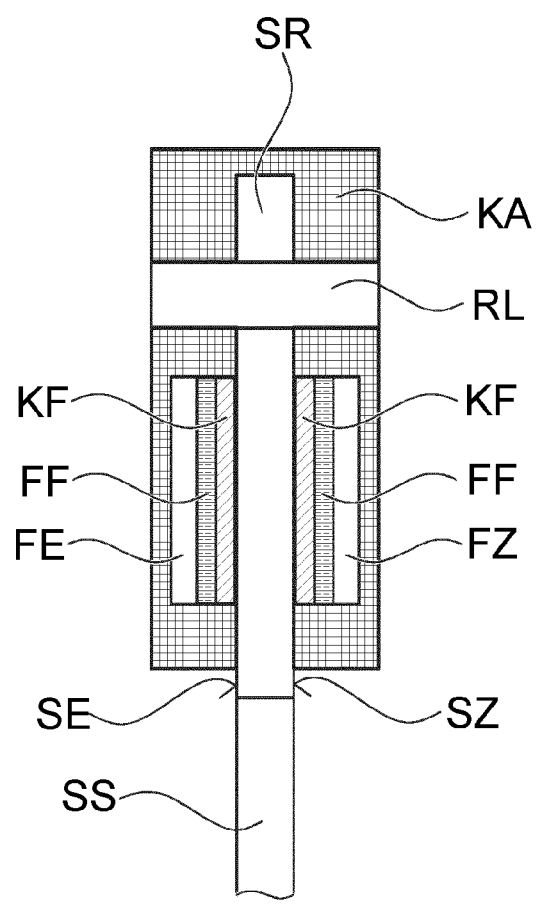
Figure 7:
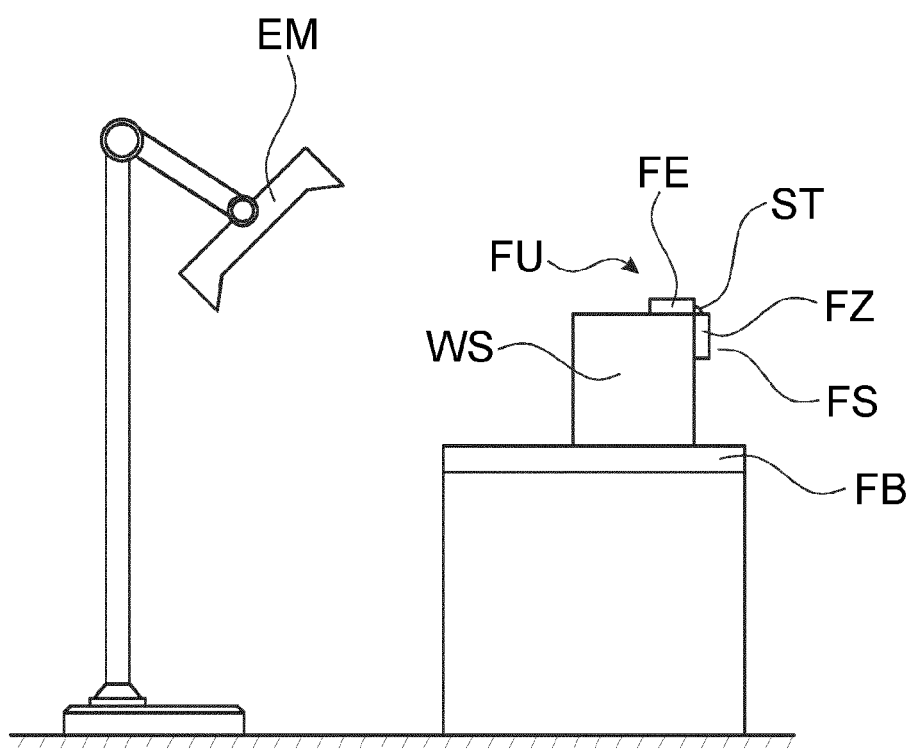

FIG. 3 shows a further embodiment of a radio transmission device, disposed on a key, FIG. 4 shows the radio transmission device and the key from FIG. 3 in a sectional diagram, FIG. 5 shows a further embodiment of a radio transmission device, disposed on a key, FIG. 6 shows the radio transmission device and the key from FIG. 5 in a sectional diagram, together with a cap, and FIG. 7 shows the radio transmission device on a carrier plate, which is part of a workpiece, within a receiver device.

Figure 1:
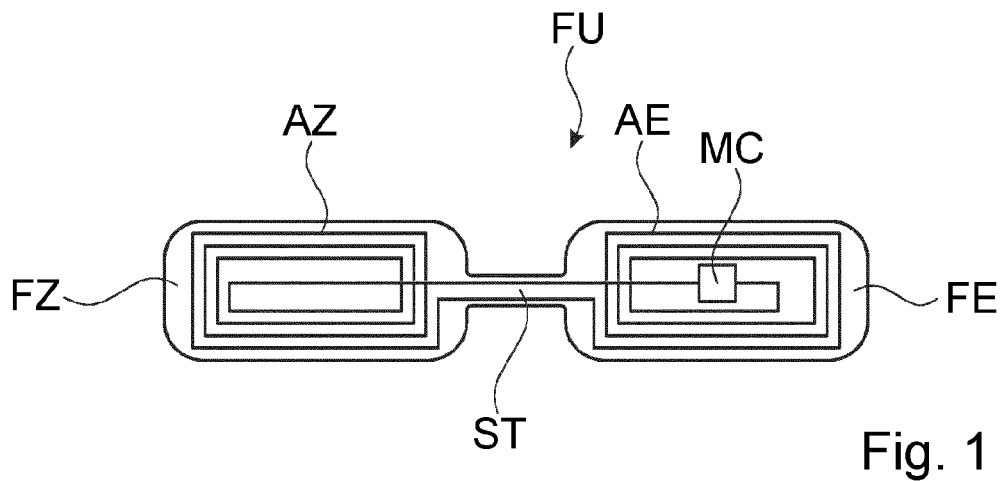
FIG. 1 shows a first embodiment of a radio transmission device.

FIG. 1 shows a passive radio transmission device FU having a first foil FE, on which a first antenna AE is disposed, and a second foil FZ, on which a second antenna AZ is disposed. The first foil FE and the second foil FZ are connected to one another via a web ST. Across the web ST, the first antenna AE and the second antenna AZ are connected by means of a connecting line. At the center of the first antenna AE, a microchip MC, the information of which can be transmitted by radio from the first antenna AE and the second antenna AZ, is disposed on the first foil FE. The first antenna AE and the second antenna AZ are respectively constructed in the form of spirals, wherein the spiral begins in the middle of the two foils.

The passive radio transmission device FU shown in FIG. 1 may be disposed together with its two foils on two sides of an electrically conductive carrier plate. For this purpose, the web ST is designed to be flexible, so that it can be bent around the carrier plate. However, the outer shape of the first foil and of the second foil are not limited to the rectangular shape as shown in FIG. 1.

Figure 2:
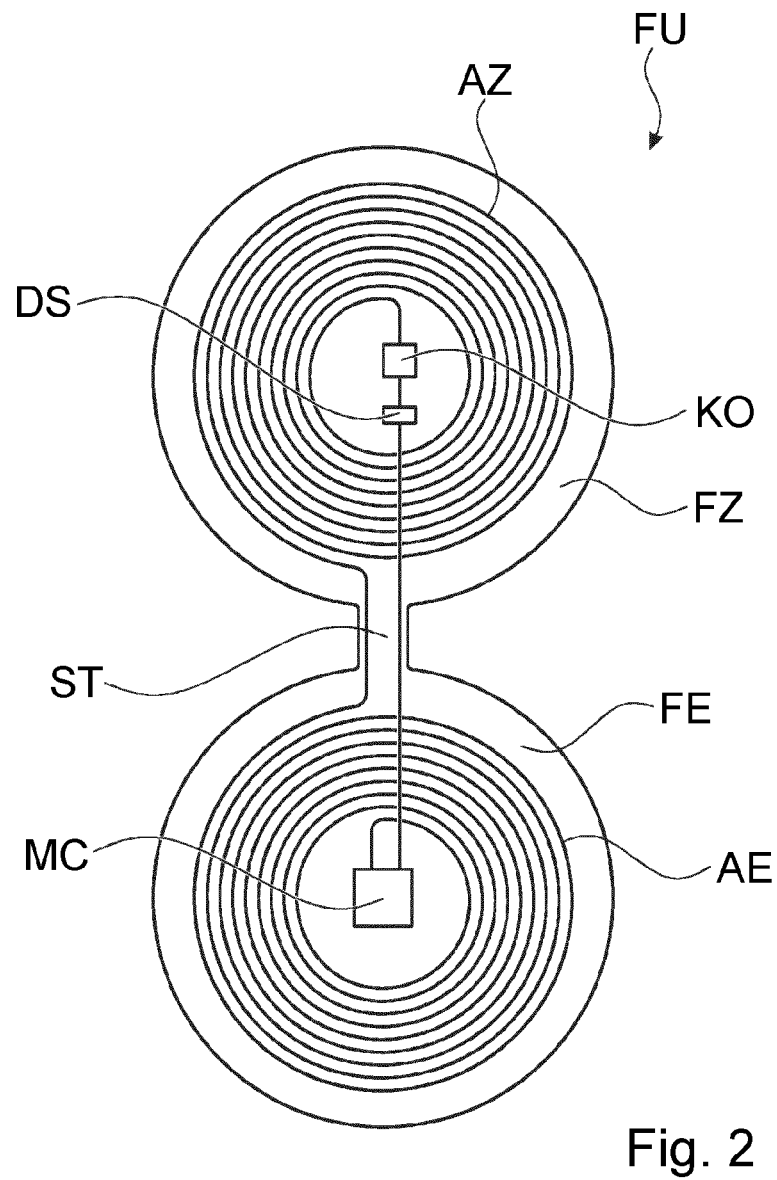
FIG. 2 shows a further embodiment of the radio transmission device.

FIG. 2 shows an embodiment of the passive radio transmission device FU in which a first antenna AE and a microchip MC are disposed on the first foil FE and a second antenna AZ, a capacitor KO and a data memory DS are disposed on the second foil FZ. The first antenna AE and the second antenna AZ are respectively formed as spirals, which are connected in series across the web ST. The microchip MC is disposed at the center of the first antenna AE. The capacitor KO and the data memory DS are disposed at the center of the second antenna AZ. The data memory DS and the capacitor KO are likewise disposed in the series circuit of the first antenna AE and of the second antenna AZ.

In FIG. 3, a passive radio transmission device FU is shown that is disposed on a key bow SR or a key SC. The key SC comprises a key blade SS, a profile PR, key cuts ES, a key shoulder SA and a key bow SR. The key blade SS, the profile PR, the key cuts ES and the key shoulder SA form the part of the key referred to as the bit. The radio transmission device FU was disposed with the first foil FE on a first side of the key bow SR, then folded over the web ST, so that the second foil FZ is made to lie on the rear side SZ of the key bow SR, whereupon the second foil FZ has been fastened on the rear side SZ of the key bow. The web ST then forms a connection of the foils disposed on the two opposite sides of the key. Connecting lines that connect the two antennas with one another or connect the two antennas with the microchip run through the flexible web.

In FIG. 4, the key together with radio transmission device FU from FIG. 3 is shown in a sectional diagram. On the front side SE of the key SC, the first foil FE was fixed by means of an adhesive layer KF. Then the second foil FZ was folded across the web ST onto the rear side SZ of the key SC and finally the second foil FZ was joined to the rear side SZ of the key SC via an adhesive layer KF. The web ST projects beyond the key bow SR. The adhesive layers KF end in the region of the web ST, so that this projects beyond the end face of the key bow SR only by the material thickness of the web ST. The key blade SS is not contacted by the radio transmission device FU, so that the key SC may also continue to be used without restriction as a mechanical key. In particular, it was not necessary to mechanically remachine the key SC from FIG. 3 and FIG. 4. Due to the arrangement of the radio transmission device FU on both sides of the key, as shown in FIG. 4, the first antenna AE and the second antenna AZ are able to reach an almost spherical space around the key SC with radio waves. Thus the orientation of the key SC relative to a receiver device (not illustrated) is almost without significance for the function of the radio transmission device FU.

An alternative configuration of the passive radio transmission device FU on a key was illustrated in FIG. 5. The radio transmission device FU in this case is selected such that a ring hole RL of the key SC is not covered. Nevertheless, it was possible to dispose the radio transmission device FU on both sides of the key bow SR, wherein only the front side SE of the key SC is illustrated in FIG. 5, on which side the first foil FE is disposed together with the first antenna AE. The web ST connects the first foil FE with the second foil FZ disposed on the rear side (not visible) of the key bow SR. A connecting line runs through the web.

In FIG. 6, the passive radio transmission device for arrangement on a key SC from FIG. 5 is illustrated in a sectional view. A layer in the form of a ferrite foil FF for conduction of the magnetic flux was applied between the radio transmission device FU and the key SC, which layer is fastened on the key by means of an adhesive layer KF. The ferrite foil FF functions for reflection and amplification of radio signals as well as for suppression of eddy currents in the electrically conductive key, wherein the first foil FE and the second foil FZ, in which the first antenna AE and the second antenna AZ as well as further electronic component parts are disposed, were constructed as a polymer foil.

A cap KA, which holds the passive radio transmission device FU on the key and protects if from mechanical damage, was disposed around the radio transmission device FU in FIG. 6. This cap KA is made from a soft elastic material, so that the cap KA can be pulled easily over the key bow SR. As in the view illustrated in FIG. 6, the interior of the cap KA may have a hollowed-out space, which accommodates the radio transmission device FU. However, since the radio transmission device FU usually has an overall structure in the millimeter range, this hollow in the interior of the cap KA is not absolutely necessary. Instead of a soft elastic cap KA, it would also have been possible to use a hard cap KA of plastic formed from two half shells. The ring hole RL of the key SC is also cut out through the cap KA, so that the ring hole may continue to be used for passage of a key ring, for example on a bunch of keys.

By separation of the bit of the key, the key from FIGS. 3 to 6 may be converted to a key fob having passive transponder function.

The description for FIGS. 3 to 6 can be expanded without restrictions to key fobs as carrier plates of the radio transmission device, wherein key fobs, in contrast to mechanical keys, have no bits from the very beginning or these have been removed.

In FIG. 7, a passive radio transmission device having a first foil FE, a second foil FZ and a web ST is shown, which was disposed on a workpiece WS. A detail view of the passive radio transmission device is shown by way of example in FIG. 2. The workpiece is disposed on a conveyor belt within a production line and is to be identified by a receiver EM. The receiver is disposed on one side of the conveyor belt FB, so that a radio shadow FS is formed on the side of the workpiece situated opposite the receiver EM.

The second foil FZ of the radio transmission device FU is situated within this radio shadow and thus is unable to receive any electromagnetic waves of the receiver EM. However, the first foil FE of the radio transmission device FU was disposed on another side face of the workpiece WS, which is oriented such that the electromagnetic waves of the receiver EM can be received by the first antenna AE disposed in the first foil FE. Thus the radio transmission device is able to communicate with the receiver and to transmit the information relevant for identification to the receiver. The first antenna AE converts the necessary energy for transmission to the form of an induction current from the electromagnetic waves of the receiver EM, which current is temporarily stored for transmission of the information by a capacitor KO (not illustrated) and is delivered to the microchip. On the basis of the arrangement of the two foils on two sides, which are differently oriented in space, the function of the transponder is almost independent of the location of the workpiece WS in space and the workpiece WS can be identified despite radio shadows.

The features indicated in the forgoing and those indicated in the claims as well as those that can be inferred from the figures can be advantageously implemented both individually and in various combinations. The invention is not restricted to the described exemplary embodiments but instead may be modified in quite a few ways within the scope of the abilities of persons skilled in the art.

The invention claimed is:

1. A mechanical key comprising a passive radio transmission device disposed on a front side and a rear side of an electrically conductive carrier plate that is a key bow of the mechanical key,
    wherein the radio transmission device comprises, on the front side of the carrier plate, a first foil having a first antenna and a microchip coupled with the first antenna and, on the rear side, a second foil having a second antenna, wherein the first foil is connected with the second foil via a flexible web, which is routed around an end face of the carrier plate connecting the front side with the rear side, so that the second antenna is connected with the first foil via at least one connecting line running along the flexible web, in order to transmit information from the microchip both on the basis of the first antenna and of the second antenna, and wherein the first foil, the second foil and the flexible web are combined as one component part.

2. The mechanical key according to claim 1, further comprising, on the first foil or on the second foil, an energy reservoir, which feeds the microchip with electrical energy.

3. The mechanical key according to claim 1, further comprising, on the first foil or on the second foil, a data memory, the data of which can be read out by the microchip.

4. The mechanical key according to claim 1, further comprising, on a side of the radio transmission device turned toward the carrier plate, a layer for conduction of the magnetic flux disposed underneath the first foil or the second foil.

5. The mechanical key according to claim 4, wherein the layer for conduction of the magnetic flux is formed as a ferrite foil.

6. The mechanical key according to claim 1, wherein the radio transmission device is fastened on the carrier plate by an adhesive layer.

7. The mechanical key according to claim 6, wherein the adhesive layer comprises an adhesive foil.

8. The mechanical key according to claim 1, further comprising a cap disposed around the carrier plate, wherein the cap holds the radio transmission device on the carrier plate.

9. The mechanical key according to claim 1, wherein:
the first antenna and the second antenna are connected in series, with the first antenna and the second antenna being respectively connected to the microchip, or
the first antenna and the second antenna are connected in parallel.

10. The mechanical key according to claim 1, wherein the flexible web has a width that is larger than the conductor-track width of the connecting line.

11. The mechanical key according to claim 1, wherein the first foil and the second foil are chosen in such a way with respect to their dimensions that a ring hole remains accessible in the key bow of the mechanical key.

12. A method for retrofitting a mechanical key, comprising the steps:
Provision of a mechanical key, which with respect to its function is adapted to a locking system,
Provision of a passive radio transmission device, which comprises a first foil having a first antenna and a microchip coupled with the first antenna, and a second foil having a second antenna, wherein the first foil is connected to the second foil via a flexible web,
Disposing the first foil of the radio transmission device on a front side of an electrically conductive key bow of the mechanical key,
Disposing the second foil of the radio transmission device on the rear side of the key bow of the mechanical key, wherein the first foil is connected with the second foil via a flexible web, which is routed around an end face of the mechanical key connecting the front side with the rear side, so that the second antenna is connected with the first foil via at least one connecting line running along the flexible web, in order to transmit information from the microchip both on the basis of the first antenna and of the second antenna, and
Programming the microchip of the passive radio transmission device with an access authorization.

13. The method according to claim 12, in which the passive radio transmission device is provided with a cap.

14. The method according to claim 12, in which the key bow, after removal of a key bit, forms a key fob.

* * * * *